US012677128B2

(12) United States Patent
Runeson et al.

(10) Patent No.: US 12,677,128 B2
(45) Date of Patent: Jul. 7, 2026

(54) MULTIPLE SPID CONFIGURATION

(71) Applicant: Telefonaktiebolaget LM Ericsson (publ), Stockholm (SE)

(72) Inventors: Stefan Runeson, Lund (SE); Tomas Nylander, Värmdö (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 549 days.

(21) Appl. No.: 17/800,102

(22) PCT Filed: Feb. 26, 2020

(86) PCT No.: PCT/SE2020/050216
§ 371 (c)(1),
(2) Date: Aug. 16, 2022

(87) PCT Pub. No.: WO2021/173049
PCT Pub. Date: Sep. 2, 2021

(65) Prior Publication Data
US 2023/0102021 A1     Mar. 30, 2023

(51) Int. Cl.
*H04W 8/02*      (2009.01)
*H04W 4/60*      (2018.01)
(Continued)

(52) U.S. Cl.
CPC .............. *H04W 8/02* (2013.01); *H04W 4/60* (2018.02); *H04W 8/18* (2013.01); *H04W 8/22* (2013.01); *H04W 8/26* (2013.01)

(58) Field of Classification Search
CPC ........... H04W 8/02; H04W 8/22; H04W 8/26; H04W 4/60; H04W 8/18
See application file for complete search history.

(56) References Cited

U.S. PATENT DOCUMENTS 5,715,241 A * 2/1998 Glass, III .......... H04M 1/27485
                                                            370/255
6,031,848 A * 2/2000 Brennan ............. H04L 25/0262
                                                            370/522
(Continued)

FOREIGN PATENT DOCUMENTS

WO     WO-2013043088 A1 * 3/2013 ........... H04L 67/568
WO     2019 011953 A1    1/2019
WO     2019 229188 A1   12/2019

OTHER PUBLICATIONS

PCT International Preliminary Report On Patentability issued for International application No. PCT/SE2020/050216—Feb. 11, 2022.
(Continued)

*Primary Examiner* — Mounir Moutaouakil
(74) *Attorney, Agent, or Firm* — Baker Botts L.L.P.

(57) ABSTRACT

Disclosed herein is a method of a network operator entity for configuring Subscriber Profile Identification, SPID, associated with a permanent identifier of a communication device operating in a wireless communication network. The method comprises determining whether the device requires two or more SPID values based on a desired network handling of the 5communication device; configuring the permanent identifier of the device to be associated with two or more SPID values based on the determined desired network handling of the communication device; and storing at a network database, the two or more SPID values associated with the permanent identifier of the communication device.

15 Claims, 2 Drawing Sheets

100

110
Determine nbr of SPIDs

120
Configure IMSI with SPIDs

130
Store SPIDs

(51) Int. Cl.
    *H04W 8/18*        (2009.01)
    *H04W 8/22*        (2009.01)
    *H04W 8/26*        (2009.01)

(56)             References Cited

U.S. PATENT DOCUMENTS

| | | | | |
|---|---|---|---|---|
| 6,044,066 | A * | 3/2000 | Glass, III | H04Q 11/0457 370/252 |
| 9,226,130 | B2 * | 12/2015 | Nylander | H04W 36/0055 |
| 10,425,817 | B2 * | 9/2019 | Torvinen | H04W 12/0433 |
| 10,440,558 | B1 | 10/2019 | De Figueiredo Junior et al. | |
| 2014/0308966 | A1 * | 10/2014 | Wang | H04W 48/20 455/450 |
| 2015/0065106 | A1 * | 3/2015 | Catovic | H04W 88/06 455/418 |
| 2018/0007493 | A1 * | 1/2018 | Yang | H04W 4/70 |
| 2018/0013680 | A1 * | 1/2018 | Bull | H04W 72/1268 |
| 2018/0063698 | A1 | 3/2018 | Sonntag | |
| 2018/0295510 | A1 | 10/2018 | Vikberg et al. | |
| 2019/0045353 | A1 | 2/2019 | Chastain et al. | |
| 2019/0312979 | A1 * | 10/2019 | Sharma | G06Q 30/0201 |
| 2019/0327603 | A1 | 10/2019 | De Figueiredo Junior et al. | |
| 2020/0008049 | A1 * | 1/2020 | Namiranian | H04W 12/0433 |
| 2020/0021993 | A1 * | 1/2020 | Yang | H04L 63/123 |
| 2020/0196130 | A1 * | 6/2020 | Tamura | H04W 8/02 |
| 2020/0267753 | A1 * | 8/2020 | Adjakple | H04W 72/54 |
| 2021/0021993 | A1 * | 1/2021 | Yang | H04W 12/0433 |
| 2021/0092603 | A1 * | 3/2021 | Yang | H04L 9/0844 |
| 2021/0203656 | A1 * | 7/2021 | Fowler | H04L 63/0823 |
| 2022/0210764 | A1 * | 6/2022 | Hong | H04W 68/005 |
| 2022/0312292 | A1 * | 9/2022 | Hong | H04W 36/0058 |
| 2023/0091739 | A1 * | 3/2023 | Sabouri-Sichani | H04W 72/0453 370/329 |
| 2023/0189131 | A1 * | 6/2023 | Huang | H04W 28/0268 370/328 |

OTHER PUBLICATIONS

PCT Notification of Transmittal of the International Search Report and the Written Opinion of the International Searching Authority, or the Declaration issued for International application No. PCT/SE2020/050216—Jan. 19, 2021.

\* cited by examiner

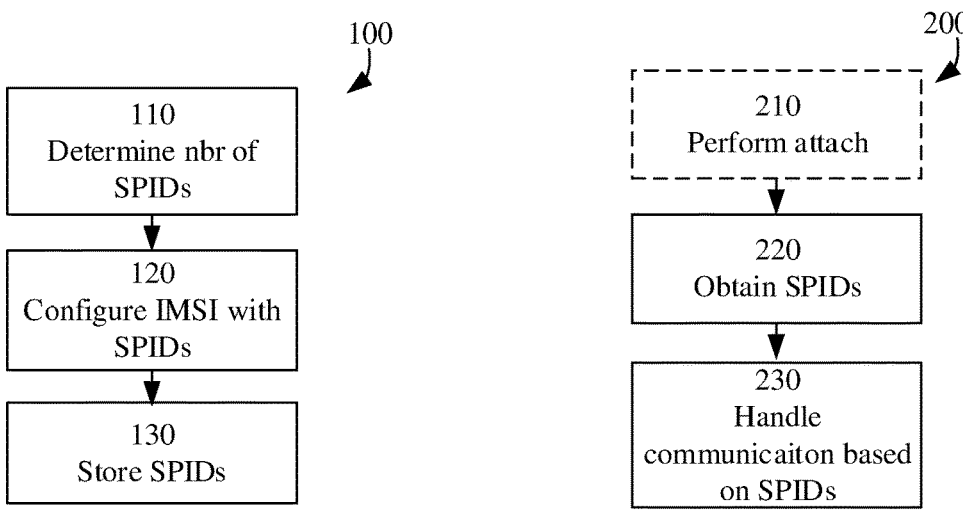
Fig. 1
Fig. 2
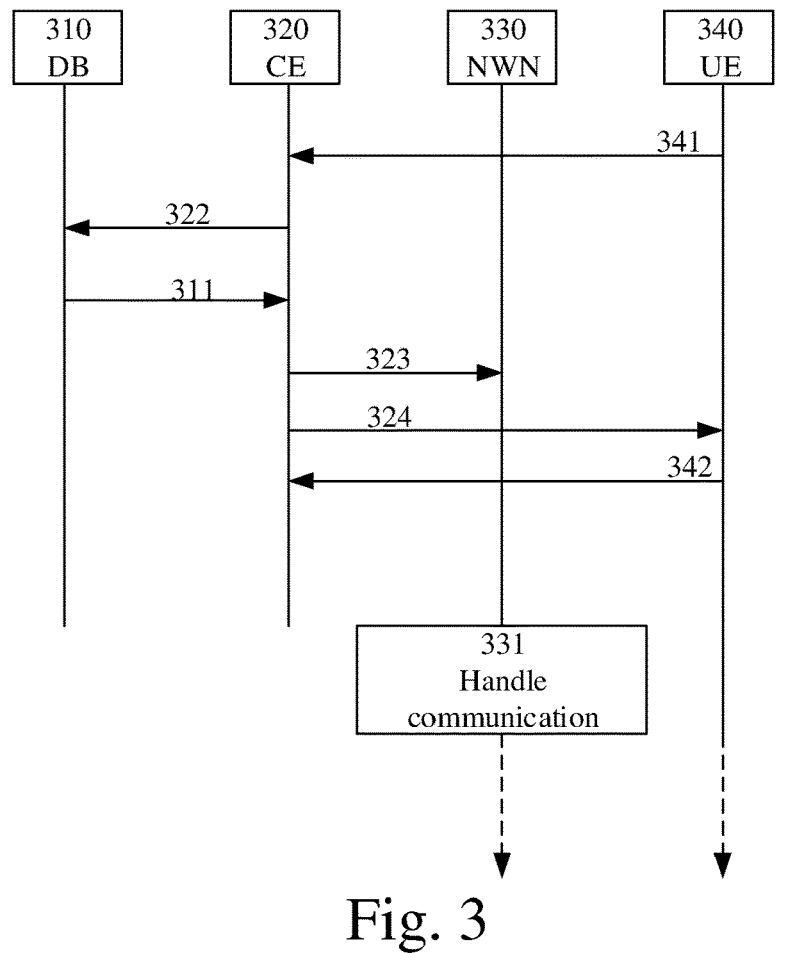
Fig. 3

Fig. 5                    Fig. 6

MULTIPLE SPID CONFIGURATION

PRIORITY

This nonprovisional application is a U.S. National Stage Filing under 35 U.S.C. § 371 of International Patent Application Serial No. PCT/SE2020/050216 filed Feb. 26, 2020, and entitled "Multiple SPID Configuration" which is hereby incorporated by reference in its entirety.

TECHNICAL FIELD

The present invention relates generally to the field of wireless communication. More particularly, it relates to configuration of Subscriber Profile Identities (SPIDs) for wireless communication devices.

BACKGROUND

In wireless communication, the communication devices typically comprise a permanent identifier such as e.g. an International Mobile Subscriber Identity (IMSI) or a Subscription Permanent Identifier (SUR) which is unique for the device and identifies it towards the network in which it is to communicate. In order to handle communication within the network with the communication devices, a network operator may further assign a SPID value for Radio Access Technology and Frequency Priority parameters to each communication device. The SPID is an index referring to user information which is typically device specific and applicable to all its radio bearers. The SPID values that can be assigned are typically divided into two ranges, range 1: values 1-128 which are used for Operator specific values; and range 2: values 129-256 which are used for Reference SPID values.

The configuration of SPID values is an un-flexible procedure and hence there is a need for methods and apparatuses for flexible SPID configuration in order to improve overall network communication.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above disadvantages and to provide a method and apparatus for configuring SPIDs associated with a permanent identifier of a communication device as well a method and apparatus of a network node for handling communication with a communication device based on the configured SPIDs.

According to a first aspect, this is achieved by a method of a network operator entity for configuring Subscriber Profile Identification, SPID, associated with a permanent identifier of a communication device operating in a wireless communication network. The method comprises determining whether the device requires two or more SPID values based on a desired network handling of the communication device.

The method also comprises configuring the permanent identifier of the device to be associated with two or more SPID values based on the determined desired network handling of the communication device and storing at a network database, the two or more SPID values associated with the permanent identifier of the communication device.

In some embodiments, the permanent identifier is an International Mobile Subscriber Identity, IMSI.

In some embodiments, the permanent identifier is a Subscription Permanent Identifier, SUPI.

In some embodiments, the two or more SPID values comprises at least one operator specific value or standardised reference SPID value.

In some embodiments, the two or more SPID values comprises at least two operator specific values or standardised reference SPID value.

In some embodiments, the two or more SPID values comprises at least one operator specific value and at least one standardised reference SPID value.

In some embodiments, determining a desired network handling of the communication device comprises determining a Radio Access Network (RAN) capability for the communication device.

In some embodiments, determining a desired network handling of the communication device comprises determining a number of reception antennas of the communication device.

In some embodiments, determining a desired network handling of the device comprises determining a mobility profile and/or a service usage profile of the communication device.

In some embodiments associating the two or more SPID values with the permanent identifier of the communication device comprises assigning a vector, a list or an index comprising the two or more SPID values to the permanent identifier.

In some embodiments, the wireless communication network is a 4G network, and the network database is a Home Subscriber Server, HSS.

In some embodiments, the wireless communication network is a Long Term Evolution, LTE, network.

In some embodiments, a radio part of the wireless communication network is a LTE network. In some embodiments, the wireless communication network is a 5G network.

In some embodiments, the wireless communication network is a New Radio, NR, network, and the network database is at least one of a User Data Repository, UDR; User Data Management, UDM; Policy Control Function, PCF; Network Exposure function, NEF; and Authentication Server Function, AUSF.

In some embodiments, the radio part of the wireless communication network is a NR network.

A second aspect is a method of a network node operating in a wireless communication network. The method is for handling communication between the network node and a communication device and comprising obtaining from a network database at least two Subscriber Profile Identification, SPID, values associated with the IMSI of the communication device and handling communication with the communication device based on the obtained SPID values associated with the IMSI of the communication device.

In some embodiments, the method comprises performing an attachment procedure for the communication device.

In some embodiments, obtaining the at least two SPID values associated with the permanent identifier comprises obtaining the at least two SPID values from the controlling entity (320, 420) storing the SPID values from the network database (310, 410).

In some embodiments the at least two SPID values are obtained through at least one communication protocol configured to support multiple SPID values per permanent identifier.

In some embodiments, the at least one communication protocol is one or more of the communication protocols used over the S1/N2, X2/Xn, S6/N8 reference points.

In some embodiments, the wireless communication network is a 4G network and the controlling entity is a Mobility Management Entity, MME.

In some embodiments, the wireless communication network is a Long Term Evolution, LTE, network.

In some embodiments, a radio part of the wireless communication network is a LTE network. In some embodiments, the wireless communication network is a 5G network.

In some embodiments, the controlling entity is an access and mobility management function, AMF.

In some embodiments, the wireless communication network is a New Radio, NR, network, and the network database is at least one of a User Data Repository, UDR; User Data Management, UDM; Policy Control Function, PCF; Network Exposure function, NEF; and Authentication Server Function, AUSF.

In some embodiments, the radio part of the wireless communication network is a NR network.

A third aspect is a computer program product comprising a non-transitory computer readable medium. The non-transitory computer readable medium has stored there on a computer program comprising program instructions. The computer program is configured to be loadable into a data-processing unit, comprising a processor and a memory associated with or integral to the data-processing unit. When loaded into the data-processing unit, the computer program is configured to be stored in the memory. The computer program, when loaded into and run by the processor is configured to cause the execution of the method steps according to any of the methods described in conjunction with the first and/or second aspect.

A fourth aspect is an apparatus of a network operator entity for configuring Subscriber Profile Identification, SPID, associated with a permanent identifier of a communication device operating in a wireless communication network. The apparatus comprises controlling circuitry configured to cause determination of whether the device requires two or more SPID values based on a desired network handling of the communication device. The controlling circuitry is also configured to cause configuration of the permanent identifier of the device to be associated with two or more SPID values based on the determined desired network handling of the communication device and storing at a network database, of the two or more SPID values associated with the permanent identifier of the communication device.

In some embodiments, the two or more SPID values comprises at least one operator specific value or standardised reference SPID value.

In some embodiments, being configured to cause determination of a desired network handling of the communication device comprises cause determination of a Radio Access Network (RAN) capability for the communication device.

In some embodiments, being configured to cause determination of a desired network handling of the communication device comprises cause determination a number of reception antennas of the communication device.

In some embodiments, being configured to cause determination of a desired network handling of the communication device comprises cause determination of a mobility profile and/or a service usage profile of the communication device.

In some embodiments, the wireless communication network is a 4G network and the network database is a Home Subscriber Server, HSS.

A fifth aspect is a network operator entity comprising the apparatus according to fourth aspect.

A sixth aspect is an apparatus of a network node operating in a wireless communication network. The apparatus is for handling communication between the network node and a communication device. The apparatus comprises controlling circuitry configured to cause obtainment from a network database of a Subscriber Profile Identification, SPID, value associated with the permanent identifier of the communication device and handling of communication with the communication device based on the obtained SPID values associated with the permanent identifier of the communication device.

In some embodiments, the controlling circuitry is configured to cause obtainment of the at least two SPID values associated with the permanent identifier by being configured to cause obtainment of the at least two SPID values from the controlling entity storing of the SPID values from the network database.

In some embodiments, the controlling circuitry is configured to cause obtainment of the at least two SPID values through at least one communication protocol configured to support multiple SPID values per permanent identifier.

In some embodiments, the wireless communication network is a 4G network and the controlling entity is a Mobility Management Entity, MME.

A seventh aspect is a network node comprising the apparatus according to the sixth aspect.

In some embodiments, any of the above aspects may additionally have features identical with or corresponding to any of the various features as explained above for any of the other aspects.

An advantage of some embodiments is that handling of network communication becomes more flexible since a communication device may be associated with more than one SPID.

Yet an advantage of some embodiments is that a communication device may be assigned two or more operator specific values and/or one or more reference SPID values for the same permanent identifier.

BRIEF DESCRIPTION OF THE DRAWINGS

Further objects, features and advantages will appear from the following detailed description of embodiments, with reference being made to the accompanying drawings, in which:

FIG. 1 is a flowchart illustrating example method steps according to some embodiments;

FIG. 2 is a flowchart illustrating example method steps according to some embodiments;

FIG. 3 is a combined flowchart and signaling diagram illustrating example method steps according to some embodiments;

FIG. 5 is a block diagram illustrating an example arrangement according to some embodiments;

FIG. 6 is a block diagram illustrating an example arrangement according to some embodiments.

DETAILED DESCRIPTION

Figure 4:
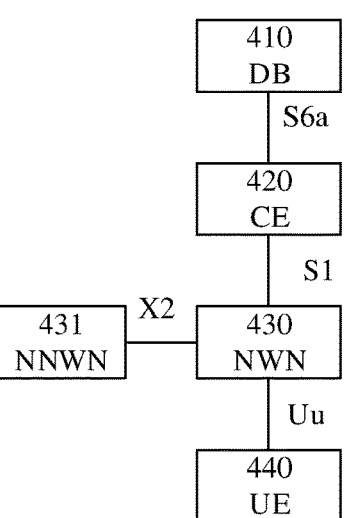
FIG. 4 is a schematic drawing illustrating a network topology according to some embodiments.

In the following, embodiments will be described where handling of network communication is enhanced by configuring multiple SPIDs per permanent identifier. It should be noted that the term permanent identifier may e.g. relate to International Mobile Subscriber Identity, IMSI, (e.g. in a 4G scenario) or a Subscription Permanent Identifier SUPI (e.g. in a 5G scenario). The term permanent identifier may hence be used interchangeably with the terms IMSI and SUPI throughout this disclosure.

Hence, even if the terms IMSI is used excessively throughout this application, it should be noted that the term could just as well be replaced with the term SUPI or permanent identifier, and the choice of term is typically depending on the network scenario.

As noted earlier, SPID values are typically divided into two ranges. Range 1 comprising values 1-128 for operator specific SPID values; and range 2 comprising values 129-256 for reference SPID values.

The SPID value may be used for communication handling within the network. E.g., the SPID values enable grouping devices into different cells or frequencies based on their subscriber information. It may also affect decisions regarding hand over and camping of devices on specific cells. The SPID values may also denote what capabilities are desirable for a certain device. Such capabilities may e.g. relate to preferable radio access network or other radio resource management strategies.

The SPID value may also give information on the type of communication device as well as what priority orders are desirable/required for a certain device.

As problem noted earlier, the SPID can only hold one single value per IMSI. This puts limitations in the communication handling within the network, since e.g. the assignment of a reference value excludes operator specific values as well as other reference values for that particular device. This may impact the overall network performance, and may put limitations in the communication handling between network nodes and communication devices.

FIG. 1 illustrates a method 100 according to some embodiments for SPID configuration. The method 100 is of a network operator entity for configuring Subscriber Profile Identification, SPID, associated with a permanent identifier of a communication device operating in a wireless communication network.

The network operator entity may e.g. be a virtual or physical server/network node run and/or owned by a network operator and deployed such that it may manage devices and configuration within a communication network associated with the operator.

The communication device may be one or more of a mobile terminal, internet of things (IoT) device, machine type communication (MTC) device, computer, smart phone, user equipment (UE), tablet, lap top, cell phone or any other suitable wireless communication device configured to operate within a wireless communication network.

The method 100 starts in step 110 with the operator entity determining whether the device requires two or more SPID values based on a desired network handling of the communication device. The operator may e.g. know or have preferences on the function of the device that is to be deployed in the network and may determine suitable SPIDs based on this knowledge/preferences.

Determining a desired network handling of the communication device may, in some embodiments, comprise determining a Radio Access Network (RAN) capability for the communication device. The operator may e.g. determine that the device should use a specific RAN for communication or camping, and may e.g. determine suitable SPID reference values which denotes a desired priority when connecting to available RANs.

The operator entity may e.g. determine that a certain device have or should have certain capabilities and communication with the device should be handled in a certain manner. E.g. if the communication device is an automotive device subscriber it will be assigned SPID reference value 253 but the operator may determine that it still may have new radio capability or that it should camp on a certain cell or RAN whenever possible, and may assign one or more further operator specific SPID values denoting these preferences in communication handling.

In some embodiments, determining a desired network handling of the communication device may comprise determining a number of reception antennas of the communication device. E.g. if the number of reception antennas of the device is less than four, the device may be seen as an automotive device, and it should be assigned at least standardised reference SPID value 253.

In some embodiments, determining a desired network handling of the device may comprise determining a mobility profile and/or a service usage profile of the communication device.

The mobility profile and/or service usage profile typically refers to user specific information which applies to all its radio bearers. User specific information may e.g. be vendor specific network functions for prioritization of devices.

Another example may be assigning several reference values for denoting a desired priority order of the device possibly in combination with one or more operator specific values.

Hence, in some embodiments the two or more SPID values comprises at least one operator specific value or standardised reference SPID value.

In some embodiments, the two or more SPID values may comprise two or more operator specific values and/or two or more standardised reference SPID values.

The method thus continues in step 120 with the operator entity configuring the permanent identifier of the device to be associated with two or more SPID values based on the determined desired network handling of the communication device. In step 130 the method comprises storing at a network database, the two or more SPID values associated with the IMSI of the communication device.

Configuring/associating (the terms may be used interchangeably) two or more SPID values with the permanent identifier of the communication device may in some embodiments comprise assigning a vector, a list or an index comprising the two or more SPID values to the IMSI.

When storing the information, the operator entity may thus transmit to the network database e.g. a vector, a list or an index comprising the IMSI of a particular device and the SPID values configured/associated to that IMSI.

The method 100 may be applicable in 4G network scenarios (where the radio network is LTE) as well as 5G network scenarios (where the radio network is New Radio).

In a 4G network scenario, the operator entity may store the associated SPID values at a Home subscriber server (HSS).

In some embodiments, a 4G wireless communication network may be a LTE network. The HSS (or network database) may further form part of an evolved packet core (EPC) architecture operating in association with the LTE network.

In a 5G network scenario, the operator entity may store the two or more SPID values configured per each SUPI at a at least one of a User Data Repository, UDR; User Data Management, UDM; Policy Control Function, PCF; Network Exposure function, NEF; and Authentication Server Function, AUSF.

The network operator entity is assigned with configuring SPIDs to its communication devices (i.e. the devices that are to be active within its associated network), and the assignment/configuration of multiple SPIDs per permanent identifier will then affect the communication handling between a network node deployed in the network and the communication device.

FIG. 2 thus illustrates a method 200 of a network node operating in a wireless communication network for handling communication between the network node and a communication device according to some embodiments.

The wireless communication device may be the wireless communication device as explained in conjunction with FIG. 1. In the same manner, the wireless communication network may be the wireless communication network as described in conjunction with FIG. 1.

The network node may e.g. be an eNB, gNB, base station, or other suitable network node for handling communication with the users (i.e. wireless communication devices) deployed within the network.

The method 200 may in some embodiments start in optional step 210 with the network node performing or taking part in an attachment procedure for attaching to the communication device. The attachment procedure may e.g. involve receiving the necessary information relating to the communication device in order to handle communication with the communication device. The information may e.g. be received from a controlling entity located in a core network associated with the wireless communication network. Performing an attachment procedure for the communication device may include receiving or otherwise obtaining an indication of an identity of the device. Such an identity may e.g. be associated with an International Mobile Subscriber Identity (IMSI) or Subscription Permanent Identifier (SUR) from a controlling entity associated with the wireless network.

The controlling entity may e.g. be a Mobility Management Entity (MME) in a scenario where the communication network is a 4G network. The controlling entity may in some embodiments be a Core Access and Mobility Management Function (AMF) in a scenario where the communication network is a 5G network.

The device may e.g. transmit a temporary mobile subscriber identity (TIMSI) which the controlling entity may use to find the IMSI (or SUPI) of the device. The IMSI may then be used to retrieve the required information relating to the two or more SPIDs associated with the IMSI as is described below.

The Temporary Mobile Subscriber Identity (TMSI) is the identity that is most commonly sent between the device and the network. TMSI is randomly assigned by the visitor location register (VLR) to every device in the area, the moment it is switched on. The number is local to a location area, and so it has to be updated each time the device moves to a new geographical area.

The network can also change the TMSI of the device at any time. And it normally does so, in order to avoid the subscriber from being identified, and tracked by eavesdroppers on the radio interface. This makes it difficult to trace which mobile is which, except briefly, when the mobile is just switched on, or when the data in the mobile becomes invalid for one reason or another. At that point, the global "international mobile subscriber identity" (IMSI) must be sent to the network. The IMSI is sent as rarely as possible, to avoid it being identified and tracked.

A key use of the TMSI is in paging a mobile. "Paging" is the one-to-one communication between the mobile and the base station. The most important use of broadcast information is to set up channels for "paging". Every cellular system has a broadcast mechanism to distribute such information to a plurality of mobiles.

The method may then continue in step 220 (or start in step 220 if optional step 210 is left out) with obtaining from a network database at least two Subscriber Profile Identification, SPID, values associated with a permanent identifier of the communication device. In some embodiments, the method may comprise obtaining the at least two SPID values from the controlling entity storing the SPID values from the network database.

The permanent identifier may be an International Mobile Subscriber Identity, IMSI for a 4G system or a Subscription Permanent Identifier (SUR) for a 5G system.

The network node may e.g. in some embodiments receive an indication of the permanent identifier from the controlling entity when performing or taking part the attachment procedure according to step 210.

The network database may e.g. be the network database as described in conjunction with FIG. 1 (i.e. the database where the network operator entity stored the configured SPIDs associated with a certain permanent identifier).

In some embodiments, obtaining the at least two SPID values associated with the permanent identifier comprises obtaining the at least two SPID values from the network database through a controlling entity (e.g. the same controlling entity which in some embodiments assist in the attachment procedure as described for step 210).

The controlling entity may e.g. be a Mobility Management Entity (MME) in a scenario where the communication network is a 4G network. The controlling entity may in some embodiments be an Access and Mobility Management Function (AMF) in a scenario where the communication network is a 5G network.

The method 200 may then continue in step 230 with handling communication with the communication device based on the obtained SPID values associated with the permanent identifier of the communication device.

The SPID values may e.g. inform the network node how this particular communication device should use different radio access networks, that it is to have a certain priority order regarding types of access networks, or that it preferably should camp at a certain radio access technology. Furthermore the SPID could be used for additional features supported be the radio access network.

The SPIDs may further inform the network node that the device is an automotive device with limited reception capabilities and that it should have certain priorities or be handled according to certain operator specific values.

As may be discerned from the descriptions of the method according to either or both of FIGS. 1 and 2, several components in a network structure may be involved in handling the SPIDs and network communication. FIG. 3 illustrates a simplified overview of the network components involved in method 200, and to some extent method 100.

FIG. 3 illustrates a network database (DB) 310 (e.g. the database described in conjunction with either or both of FIGS. 1-2), a controlling entity (CE) 320 (e.g. the controlling entity described in conjunction with either or both of FIGS. 1-2), a network node (NWN) 330 (e.g. the network node described in conjunction with either or both of FIGS. 1-2) and a communication device (UE) 340 (e.g. the communication device described in conjunction with either or both of FIGS. 1-2).

FIG. 3 mainly focuses on method 200, but may be combined with the method 100. In such case, a further network component illustrating the network operator entity may be added, which entity stores SPID values associated with a respective permanent identifier at the database 310 (compare with step 130 of the method 100).

In method 200, step 210, the network node may perform or take part in an attachment procedure for the communication device 340. This attachment procedure may, as illustrated in FIG. 3 comprise the communication device 340 transmitting 341 a request for attachment to the controlling entity 320 which is responsible for performing authorization and authentication of the communication device, and which entity also transmits 322 a request to the database 310 for information related to the communication device., The information in the database 310 may comprise the two or more SPIDs associated with the IMSI of the communication device to the database 310.

E.g. in some embodiments, the attachment procedure may comprise the controlling entity transmitting 322 a request to the database for information related to the communication device in a scenario where the permanent identifier (e.g. IMSI or SUR) of the communication device is unknown to the controlling device. The request may comprise a request for information related to the communication device. The information in the database may further comprise two or more SPIDS associated with the permanent identifier of the communication device.

In a scenario where the permanent identifier of the communication device is known to the controlling entity and further can be used to obtain information related to the communication device, the controlling entity transmits 323 relevant information that may comprise two or more SPID values associated with the permanent identifier of the communication device to the network node. Hence the SPIDs are not always received at the network node from a database, but may come directly from the controlling entity. Thus, in some embodiments, the network node receives the two or more SPID values from the controlling entity.

As noted, the database 310 may in some embodiments respond to the request by transmitting 311 the requested SPIDs (e.g. in a vector, list or indexed format) to the controlling entity 320 (the database may e.g. transmit the requested information associated with the permanent identifier to the controlling entity, which information may comprise two or more SPIDs). The controlling entity 320 may then transmit 323 the received SPID values associated with the permanent identifier of the device to the network node 330 (compare with step 220 of the method 200). The controlling entity 320 may then transmit 324 an attach accept message to the communication device 340. The device 340 may respond to the controlling entity 320 by transmitting 342 an attach complete message.

Communication between the network node 330 and the communication device 340 may then commence, and the network node 330 may handle in 331 the communication with the communication device 340 according to the obtained two or more SPIDs associated with the IMSI of the device. The communication may e.g. be handled as described in conjunction with FIGS. 1-2 (compare also with step 230 of the method 200).

In some embodiments, the at least two SPID values are obtained through at least one communication protocol configured to support multiple SPID values per permanent identifier.

Hence, the referral of messages as well as SPIDs between the different network components as described in FIG. 3 (as well as in FIGS. 1-2) is realised through communication using one or more communication protocols configured to support multiple SPID values per IMSI.

This is e.g. illustrated in FIG. 4. FIG. 4 illustrates network components as described in conjunction with FIG. 3. I.e. a database (DB) 410, a controlling entity (CE) 420, a network node (NWN) 430 a neighbouring network node (NNWN) 431 (not shown in FIG. 3) and a communication device (UE) 440.

The database 410, 310 may e.g. communicate with the controlling entity 420, 320 through a S6a communication protocol. The controlling entity 420, 320 may communicate with the network node through a S1 communication protocol. The network node may communicate with other neighbouring network nodes (not shown in FIG. 3) through an X2 communication protocol and may further communicate with the communication device 440, 340 through a Uu communication protocol.

The above identified communication protocols are standardised by 3GPP but may have to be adapted in order to accommodate the transmission of multiple SPIDs per permanent identifier.

It should be noted that the embodiments disclosed herein are not limited to the above-mentioned communication protocols, other protocols which have been adapted to allow transition of multiple SPIDs per permanent identifier are contemplated to fall within the scope of the described embodiments.

FIG. 5 illustrates an apparatus 500 of a network operator entity for configuring Subscriber Profile Identification, SPID, associated with permanent identifier, of a communication device operating in a wireless communication network.

The network operator entity may e.g. be the network operator entity as described in conjunction with any of the previous FIGS. 1-4. The wireless communication device may be the wireless communication device as described in conjunction with any of the previous FIGS. 1-4. The wireless communication network may be the wireless communication network as described in conjunction with any of the previous FIGS. 1-4.

The apparatus 500 comprises controlling circuitry (CNTR) 510. The controlling circuitry may further, in some embodiments, comprise a determiner (DET) 511 and a configuring circuitry (CONF) 512.

The apparatus 500 also comprises a transceiver circuit (RX/TX) 520 comprising one or more transmitting and receiving antennas.

The controlling circuitry 510 is configured to cause (e.g. by causing the determiner 511 to determine) determination of whether the communication device requires two or more SPID values based on a desired network handling of the communication device. The controlling circuitry 510 is also configured to cause (e.g. by causing the configuring circuitry to configure) configuration of the permanent identifier of the device to be associated with two or more SPID values based on the determined desired network handling of the communication device. The controlling circuitry is also configured to cause (e.g. by causing the transceiver to transmit to a database) storing, at a network database, of the two or more SPID values associated with the permanent identifier of the communication device.

In some embodiments, the controlling circuitry may be configured to cause configuration of the two or more SPID values such that the two or more SPID values comprises at least one operator specific value or standardised reference SPID value (e.g. in some embodiments, by causing the configuring circuitry to configure the SPIDs accordingly).

In some embodiments, the controlling circuitry is configured to cause determination of a desired network handling of the communication device by causing determination (e.g. in some embodiments, by causing the determiner 511 to determine) of a Radio Access Network (RAN) capability for the communication device.

In some embodiments, the controlling circuitry is configured to cause determination of a desired network handling of the communication device by causing determination (e.g. in some embodiments by causing the determiner 511 to determine) a number of reception antennas of the communication device. This information may e.g. be extracted from the permanent identifier of the device.

In some embodiments, the controlling circuitry is configured to cause determination of a desired network handling of the communication device by causing determination (e.g. in some embodiments by causing the determiner 511 to determine) of a mobility profile and/or a service usage profile of the communication device.

In some embodiments, the wireless communication network is a 4G, network and the network database is a Home Subscriber Server, HSS.

In some embodiments, the wireless communication network is a 5G network.

In some embodiments, the wireless communication network is a LTE (Long term evolution) network.

In some embodiments, a radio part of the wireless communication network is a LTE network.

In some embodiments, the radio part of the wireless communication network is a NR network.

In some embodiments, the wireless communication network is a New Radio, NR, network, and the network database is at least one of a User Data Repository, UDR; User Data Management, UDM; Policy Control Function, PCF; Network Exposure function, NEF; and Authentication Server Function, AUSF.

In some embodiments, the above described apparatus is comprised in a network operator entity, and is further configured to carry out any of the methods as described in conjunction with FIGS. 1 and 3.

FIG. 6 illustrates an apparatus 600 of a network node operating in a wireless communication network. The network node may e.g. be the network node as described or mentioned in conjunction with any of the previous FIGS. 1-5. The apparatus may further be configured to carry out any of the methods as described in conjunction with FIGS. 2 and 3.

The apparatus 600 is for handling communication between the network node and a communication device (e.g.

the communication device as described in conjunction with any of the previous FIGS. 1-5).

The apparatus 600 comprises a transceiver circuitry (RX/TX) 620 comprising one or more transmission and reception antennas.

The apparatus 600 comprises controlling circuitry (CNTR) 610. The controlling circuitry 610 may, in some embodiments, comprise a determiner (DET) 611 and a communication handler (COM) 612.

The controlling circuitry 610 may in some embodiments be configured to cause performance or partaking of an attachment procedure for a communication device, by causing reception of information associated with the communication device from a controlling entity operating in association with the wireless communication network. The received information may e.g. relate to an indication of a permanent identifier of the communication device, as well as two or more SPIDs associated with the permanent identifier. The controlling circuitry 610 may e.g. in some embodiments be configured to cause the transceiver circuitry 620 to receive (necessary) information about the communication device from the controlling entity in order to establish a connection to the communication device for communication within the network (compare with FIG. 3).

The controlling circuitry 610 may further be configured to cause obtainment from a network database of a Subscriber Profile Identification, SPID, value associated with the permanent identifier of the communication device and handling of communication with the communication device based on the obtained SPID values associated with the permanent identifier of the communication device. The controlling circuitry 610 may e.g. be configured to cause the determiner 611 to determine the SPID values and the communication handler 612 to handle the communication with the communication device within the network based on the determined SPID values.

In some embodiments, the controlling circuitry is configured to cause obtainment of the at least two SPID values associated with the permanent identifier by being configured to cause obtainment of the at least two SPID values from a network database through the controlling entity, by causing obtainment of the at least two SPID values from the controlling entity storing the SPID values from the network database. The controlling circuitry may e.g. cause the transceiver circuitry 620 to receive the SPIDs from the controlling entity (compare with FIG. 3).

In some embodiments, the controlling circuitry is configured to cause obtainment of the at least two SPID values through at least one communication protocol configured to support multiple SPID values per permanent identifier.

In some embodiments, the wireless communication network is a 4G network and the controlling entity is a Mobility Management Entity, MME.

In some embodiments, the wireless communication network is a 5G network and the controlling entity is an access and mobility function, AMF.

In some embodiments, a radio part of the wireless communication network is an LTE network.

In some embodiments, the radio part of the wireless communication network is a NR network.

In some embodiments, the apparatus 600 is comprised in a network node. The network node may e.g. be an eNB, gNB, base station or other type of suitable network node for handling communication with a communication device in a wireless communication network.

The methods and apparatuses described herein enables configuring an IMSI of a communication device with two or more SPID values. The SPID values may be two or more operator specific values, two or more standardised reference SPID values or a mix of both operator specific values and reference SPID values. This leads to that network communication may be handled more flexibly compared to when only one SPID per IMSI is assigned. The communication can be better tailored for each device to suit a desired overall operability of the wireless network. This gives greater freedom to the operator managing the wireless network. It may also simplify deployment of devices, since devices can be chosen more freely as their features and functions in the network may be dictated by the configured SPIDs rather than by their default features.

Figure 7:
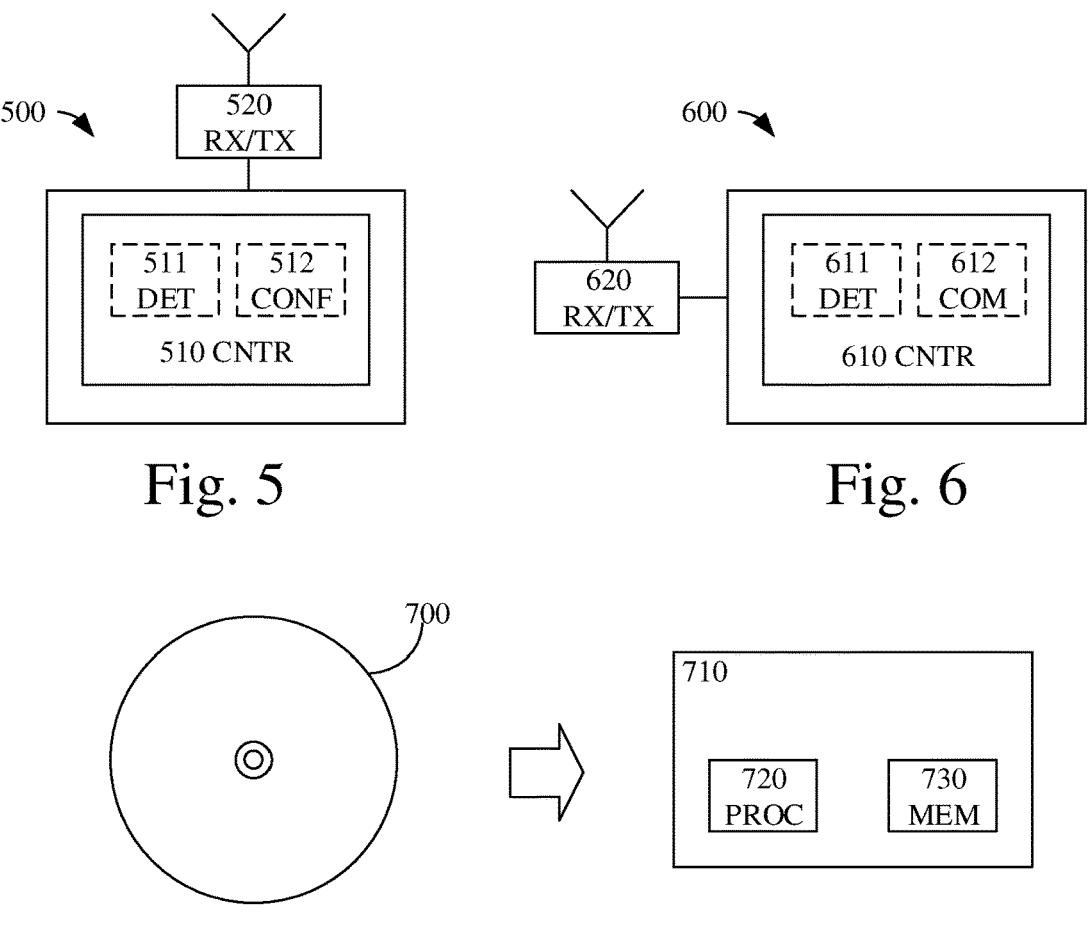
FIG. 7 is a block diagram illustrating an example arrangement according to some embodiments.

FIG. 7 illustrates a computer program product comprising a non-transitory computer readable medium 700, wherein the non-transitory computer readable medium 700 has stored there on a computer program comprising program instructions. The computer program is configured to be loadable into a data-processing unit 710, comprising a processor (PROC) 730 and a memory (MEM) 720 associated with or integral to the data-processing unit. When loaded into the data-processing unit 710, the computer program is configured to be stored in the memory 720, wherein the computer program, when loaded into and run by the processor 730 is configured to cause the processor to execute method steps according to any of the methods described in conjunction with the FIGS. 1-2 and/or sequence steps according to the sequence described in conjunction with FIG. 3.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit as described in conjunction with FIG. 7.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the claims are intended to be embraced therein.

The invention claimed is:

1. A method of a network operator entity for configuring Subscriber Profile Identification, SPID, associated with a Subscription Permanent Identifier, SUPI, that is unique for a communication device operating in a wireless communication network, the method comprising:

determining that the communication device requires two or more SPID values based on at least one of: a Radio Access Network, RAN, capability of the communication device, a number of reception antennas of the communication device, a mobility profile of the communication device, and a service usage profile of the communication device;

configuring the SUPI of the communication device to be associated with the two or more SPID values; and storing at a network database, an association between the SUPI that is unique for the communication device and the two or more SPID values that are determined to be required.

2. The method according to claim 1, wherein associating the two or more SPID values with the SUPI that is unique for the communication device comprises assigning a vector, a list or an index comprising the two or more SPID values to the SUPI.

3. The method according to claim 1, wherein the wireless communication network is a 4G network and the network database is a Home Subscriber Server, HSS.

4. The method according to claim 1, wherein the two or more SPID values associated with the SUPI of the communication device comprises at least an operator specific SPID value and a standardized reference SPID value.

5. A computer program product comprising a non-transitory computer readable medium, wherein the non-transitory computer readable medium has stored there on a computer program comprising program instructions, wherein the computer program is configured to be loadable into a data-processing unit, comprising a processor and a memory associated with or integral to the data-processing unit, wherein when loaded into the data-processing unit, the computer program is stored in the memory, wherein the computer program, when loaded into and run by the processor causes the data processing unit to:

determine that the communication device requires two or more Subscriber Profile Identification, SPID, values based on at least one of: a Radio Access Network, RAN, capability of the communication device, a number of reception antennas of the communication device, a mobility profile of the communication device, and a service usage profile of the communication device;

configuring the SUPI of the communication device to be associated with the two or more SPID values; and store, at a network database, an association between the SUPI that is unique for the communication device and the two or more SPID values that are determined to be required.

6. An apparatus of a network operator entity for configuring Subscriber Profile Identification, SPID, associated with a Subscription Permanent Identifier, SUPI, that is unique for a communication device operating in a wireless communication network, the apparatus comprising controlling circuitry configured to cause:

determination of that the communication device requires two or more SPID values based on at least one of: a Radio Access Network, RAN, capability of the communication device, a number of reception antennas of the communication device, a mobility profile of the communication device, and a service usage profile of the communication device;

configuring the SUPI of the communication device to be associated with the two or more SPID values; and storing at a network database, an association between the SUPI that is unique for the communication device and the two or more SPID values that are determined to be required.

7. The apparatus according to claim 6, wherein the wireless communication network is a 4G network and the network database is a Home Subscriber Server, HSS.

8. A network operator entity comprising the apparatus according to claim 6.

9. The apparatus according to claim 6, wherein the two or more SPID values associated with the SUPI of the communication device comprises at least an operator specific SPID value and a standardized reference SPID value.

10. An apparatus of a network node operating in a wireless communication network, for handling communication between the network node and a communication device, wherein the apparatus comprises controlling circuitry configured to cause:

obtainment from a network database of at least two Subscriber Profile Identification, SPID, values associated with a Subscription Permanent Identifier, SUPI, that is unique for the communication device, wherein the at least two SPID values associated with the SUPI of the communication device comprises at least an operator specific SPID and a standardized reference SPID value; and handling of communication with the communication device based on the obtained SPID values associated with the SUPI that is unique for the communication device.

11. The apparatus according to claim 10, wherein the controlling circuitry is configured to cause obtainment of the at least two SPID values associated with the SUPI by being configured to cause obtainment of the at least two SPID values from the controlling entity storing the SPID values from the network database.

12. The apparatus according to claim 10, wherein the controlling circuitry is configured to cause obtainment of the at least two SPID values through at least one communication protocol configured to support multiple SPID values per SUPI.

13. The apparatus according to claim 10, wherein the wireless communication network is a 4G network and the controlling entity is a Mobility Management Entity, MME.

14. A network node comprising the apparatus according to claim 10.

15. The apparatus according to claim 10, wherein the two or more SPID values associated with the SUPI of the communication device comprises at least an operator specific SPID value and a standardized reference SPID value.

* * * * *